United States Patent
Sakai et al.

(10) Patent No.: US 12,227,642 B2
(45) Date of Patent: Feb. 18, 2025

(54) POLYMER GEL HAVING SPONGE-LIKE POROUS STRUCTURE

(71) Applicant: The University of Tokyo, Tokyo (JP)

(72) Inventors: Takamasa Sakai, Tokyo (JP); Yuichi Tei, Tokyo (JP)

(73) Assignee: The University of Tokyo, Tokyo (JP)

( * ) Notice: Subject to any disclaimer, the term of this patent is extended or adjusted under 35 U.S.C. 154(b) by 667 days.

(21) Appl. No.: 17/263,403

(22) PCT Filed: Jul. 29, 2019

(86) PCT No.: PCT/JP2019/029574
§ 371 (c)(1),
(2) Date: Jan. 26, 2021

(87) PCT Pub. No.: WO2020/027016
PCT Pub. Date: Feb. 6, 2020

(65) Prior Publication Data
US 2021/0155799 A1     May 27, 2021

(30) Foreign Application Priority Data

Jul. 31, 2018 (JP) ................ 2018-144002

(51) Int. Cl.
*C08L 71/02* (2006.01)
*C08G 65/333* (2006.01)
(Continued)

(52) U.S. Cl.
CPC ........ *C08L 71/02* (2013.01); *C08G 65/33337* (2013.01); *C08G 65/334* (2013.01);
(Continued)

(58) Field of Classification Search
CPC .......... C08L 71/02; C08L 101/02; C08L 1/02; C08L 71/00; C08L 101/00;
(Continued)

(56) References Cited

U.S. PATENT DOCUMENTS 6,201,065 B1   3/2001 Pathak et al.
2008/0187568 A1   8/2008 Sawhney
(Continued)

FOREIGN PATENT DOCUMENTS

JP   H11510837 A   9/1999
JP   2008212683 A   9/2008
(Continued)

OTHER PUBLICATIONS

Sakai et al., Design and Fabrication of a High-Strength Hydrogel with Ideally Homogeneous Network Structure from Tetrahedron-like Macromonomers, Macromolecules, 41, 5379-5384, 2008.
(Continued)

*Primary Examiner* — K. Boyle
(74) *Attorney, Agent, or Firm* — Leason Ellis LLP

(57) ABSTRACT

An object of the present invention is to provide a gel material including a solvophilic polymer having a µm-scale porous structure.
A polymer gel in which solvophilic polymer units are cross-linked with each other, wherein the polymer gel contains a solvent and has a three-dimensional network structure having two regions: a first region in which the polymer units are densely present and a second region in which the polymer units are sparsely present, and a mesh size composed of the first region is from 1 to 500 µm.

20 Claims, 3 Drawing Sheets

COMPARATIVE EXAMPLE

100 µm

POLYMER GEL OF THE PRESENT INVENTION

100 µm

(51) Int. Cl.
*C08G 65/334* (2006.01)
*C08J 9/28* (2006.01)

(52) U.S. Cl.
CPC ............ *C08J 9/28* (2013.01); *C08J 2205/028* (2013.01); *C08J 2371/02* (2013.01); *C08J 2401/02* (2013.01); *C08J 2471/02* (2013.01)

(58) Field of Classification Search
CPC ............ C08G 65/33337; C08G 65/334; C08G 65/326; C08J 9/28; C08J 2205/028; C08J 2371/02; C08J 2401/02; C08J 2471/02; C08J 3/075; C08J 9/0061; C08J 2201/026; C08J 2205/025; C08J 2300/10; C08J 2400/10; C08J 5/24
See application file for complete search history.

(56) References Cited

U.S. PATENT DOCUMENTS

| | | | |
|---|---|---|---|
| 2008/0220047 | A1 | 9/2008 | Sawhney et al. |
| 2011/0293699 | A1* | 12/2011 | Bennett ............... A61K 47/34 424/400 |
| 2012/0122949 | A1 | 5/2012 | Tei et al. |
| 2018/0030205 | A1 | 2/2018 | Sakai et al. |
| 2019/0015559 | A1 | 1/2019 | Sakai et al. |

FOREIGN PATENT DOCUMENTS

| | | | | |
|---|---|---|---|---|
| JP | 2010519183 | A | | 6/2010 |
| JP | 2011246714 | A | | 12/2011 |
| JP | 2015137430 | A | | 7/2015 |
| JP | 2017121307 | A | | 7/2017 |
| WO | 2007083522 | A1 | | 7/2007 |
| WO | 2010070775 | A1 | | 6/2010 |
| WO | 2012035598 | A1 | | 3/2012 |
| WO | WO-2016143647 | A1 | * 9/2016 | ............ A61L 27/00 |

OTHER PUBLICATIONS

International Search Report and Written Opinion in PCT/JP2019/029574, mailed on Oct. 29, 2019.

Matsunaga et al.: "Structure Characterization of Tetra-PEG Gel by Small-Angle Neutron Scattering", Macromolecules, vol. 42, No. 4, pp. 1344-1351, 2009 [8 pages].

* cited by examiner

POLYMER GEL HAVING SPONGE-LIKE POROUS STRUCTURE

TECHNICAL FIELD

The present invention relates to a novel polymer gel having a porous structure including two regions: dense phase and dilute phase of a solvophilic polymer component, and a process for producing the polymer gel.

BACKGROUND ART

In recent years, polymer gels having a network-like structure have characteristics such as excellent water retention ability and biocompatibility, and therefore the polymer gels are materials that are expected to be applied to various applications such as medical applications (e.g., artificial tissues, scaffold materials for regeneration, sealing, adhesion prevention, drug delivery, and contact lenses), and applications for sensors and surface coatings (for example, Non Patent Literature 1). In particular, in applications such as scaffold materials for regeneration, it is desired to develop a polymer material having a μm-scale porous structure.

However, conventionally, in order to obtain the μm-scale porous structure, it has been necessary that a polymer material is produced using a top-down method such as microfabrication of a gel or polymer structure produced in advance by lithography or the like, or a solvent-insoluble polymer material. On the other hand, when a solvophilic polymer raw material is used, the material itself is dissolved in the solvent in the first place, or only a gel having a small (nm-scale) porous structure can be produced.

CITATION LIST

Non Patent Literature

Non Patent Literature 1: Sakai et al., Macromolecules, 41, 5379-5384, 2008

SUMMARY OF INVENTION

Technical Problem

Therefore, an object of the present invention is to provide a gel material with a μm-scale porous structure formed by solvophilic polymers, and further to provide a production process suitable for producing such a polymer gel material from a solvophilic polymer raw material.

Solution to Problem

As a result of diligent studies to solve the above problems, the present inventors have found that solvophilic polymer raw materials are crosslinked under the conditions of less than the overlapping concentration and less than the critical gelation concentration, whereby a gel having a μm-scale porous structure, which has been previously impossible to achieve, can be produced from a solvophilic polymer in a solvent in a bottom-up manner through a one-pot procedure. Further, they have found that the obtained gel material behaves like a phase separation in poorly soluble polymers, and has a peculiar structure which forms a sponge-like three-dimensional network structure (porous structure) including a dense region in which polymer components are densely present and a dilute region in which polymer components are sparsely present, and the structure has not been found in conventional polymer gels. Based on these findings, they have completed the present invention.

Specifically, according to the present invention of a first aspect, there is provided <1> a polymer gel in which solvophilic polymer units are cross-linked with each other,
wherein the polymer gel contains a solvent and has a three-dimensional network structure having two regions: a first region in which the polymer units are densely present and a second region in which the polymer units are sparsely present, and a mesh size composed of the first region is the range of 1 to 500 μm.

Further, according to preferred aspects of the polymer gel of the present invention, there are provided:

<2> the polymer gel according to <1> above, wherein the polymer gel has a lower permeability than a permeability of the polymer units before gelation;

<3> the polymer gel according to <1> or <2> above, wherein the polymer gel has an osmotic pressure of ⅕ to ½ of an osmotic pressure of the polymer units before gelation;

<4> the polymer gel according to any one of <1> to <3> above, wherein an osmotic pressure ($\Pi_{os}$) and an elastic pressure ($\Pi_{el}$) after a lapse of a certain period of time from gelation have a relationship of $\Pi_{el} > \Pi_{os}$;

<5> the polymer gel according to any one of <1> to <4> above, wherein a polymer concentration in the first region is from 10 to 99 wt %, and a polymer concentration in the second region is from 0 to 1 wt %;

<6> the polymer gel according to any one of <1> to <5> above, wherein the polymer gel has a polymer content of 5 wt % or less;

<7> the polymer gel according to any one of <1> to <6> above, wherein the polymer units are hydrophilic polymers;

<8> the polymer gel according to <7> above, wherein the hydrophilic polymers are polymers having a polyethylene glycol backbone or a polyvinyl backbone;

<9> the polymer gel according to any one of <1> to <8> above, wherein the polymer units includes a first polymer unit having one or more nucleophilic functional groups in a side chain or at an end and a second polymer unit having one or more electrophilic functional groups in a side chain or at an end; and <10> the polymer gel according to <9> above, wherein the nucleophilic functional groups are selected from the group consisting of a thiol group, an amino group, and $-CO_2PhNO_2$, and the electrophilic functional groups are selected from the group consisting of a maleimidyl group, an N-hydroxy-succinimidyl (NHS) group, a sulfosuccinimidyl group, a phthalimidyl group, an imidazolyl group, an acryloyl group, and a nitrophenyl group.

According to another aspect, the present invention relates to a process for producing the polymer gel and provides:

<11> a process for producing a polymer gel including:
a) crosslinking solvophilic raw polymers under conditions of less than an overlapping concentration and less than a critical gelation concentration to form gel precursors, wherein the gel precursors have a relationship of G'<G" between a storage modulus G' and a loss modulus G"; and
b) crosslinking the gel precursors with each other using a crosslinking agent to obtain the polymer gel,
wherein the polymer gel has a structure including two regions: a first region in which polymer units derived from the raw polymers are densely present and a second region in which polymer units derived from the raw polymers are sparsely present; and <12> a process for producing a polymer gel including c) crosslinking solvophilic raw polymers having a concentration of less than an overlapping concentration and equal to or more than a critical gelation concentration with each other in the presence of a non-reactive polymer having a predetermined concentration to obtain the polymer gel, wherein the non-reactive polymer is a polymer having no functional group capable of crosslinking with the raw polymers in a molecule, and the polymer gel has a structure including two regions: a first region in which polymer units derived from the raw polymers are densely present and a second region in which polymer units derived from the raw polymers are sparsely present.

According to preferred aspects of the process for producing a polymer gel of the present invention, there are provided:

<13> the process for producing a polymer gel according to <11> or <12> above, wherein the raw polymers are hydrophilic polymers;

<14> the process for producing a polymer gel according to <13> above, wherein the hydrophilic polymers are polymers having a polyethylene glycol backbone or a polyvinyl backbone;

<15> the process for producing a polymer gel according to any one of <11> to <14> above, wherein the raw polymers includes a first polymer having one or more nucleophilic functional groups in a side chain or at an end and a second polymer having one or more electrophilic functional groups in a side chain or at an end;

<16> the polymer gel according to <15> above, wherein the nucleophilic functional groups are selected from the group consisting of a thiol group, an amino group, and —$CO_2PhNO_2$, and the electrophilic functional groups are selected from the group consisting of a maleimidyl group, an N-hydroxy-succinimidyl (NHS) group, a sulfosuccinimidyl group, a phthalimidyl group, an imidazolyl group, an acryloyl group, and a nitrophenyl group;

<17> the process for producing a polymer gel according to <11> above, wherein the gel precursors have a diameter of 10 to 1000 nm;

<18> the process for producing a polymer gel according to <11> above, wherein the gel precursors includes a first gel precursor and a second gel precursor, the first gel precursor and the second gel precursor both have a first polymer having one or more nucleophilic functional groups in a side chain or at an end and a second polymer having one or more electrophilic functional groups in a side chain or at an end, the first gel precursor has a higher first polymer content than a second polymer content, and the second gel precursor has a higher second polymer content than a first polymer content;

<19> the process for producing a polymer gel according to <11> above, wherein step b) is conducted in the presence of a non-reactive polymer having no functional group capable of crosslinking with the gel precursor in the molecule; and <20> the process for producing a polymer gel according to <12> or <19> above, wherein the non-reactive polymer is polyethylene glycol or cellulose, which has no crosslinking reactive group.

Advantageous Effects of Invention

The polymer gel of the present invention forms a sponge-like three-dimensional network structure including a dense region in which solvophilic polymer components are densely present and a dilute region in which solvophilic polymer components are sparsely present, whereby the polymer gel has a μm-scale porous structure. Consequently, the polymer gel can be a suitable material for cell infiltration and adhesion. Since such a porous structure can selectively reflect infrared light, the porous structure can also be used for optical materials such as optical filters.

Further, according to the production process of the present invention, a gel having such a μm-scale porous structure, which has been previously impossible to achieve, can be produced from a solvophilic polymer in a solvent in a bottom-up manner through a one-pot procedure. Furthermore, in the case of using a gelation process using a gel precursor formed in a state just before gelation as a seed, after the gel precursor is applied in vivo or the like, it is possible to carry out in-situ gelation reaction. Therefore, the gel precursor can be used as a gel material that is injectable to closed and semi-closed cavities in vivo.

DESCRIPTION OF EMBODIMENTS

Figure 1:
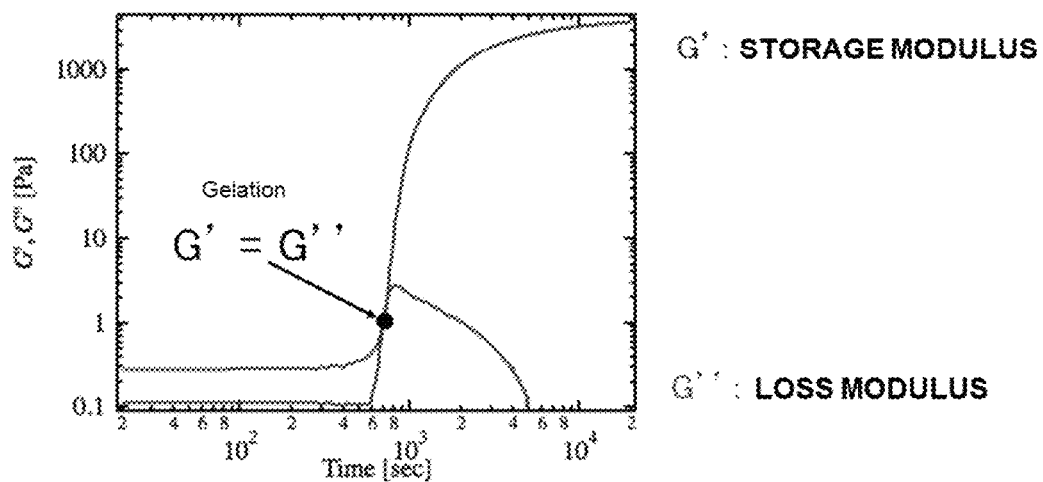
FIG. 1 is a graph showing a time scale of a gelation reaction in a polymer gel of the present invention produced in Example 2.

Hereinafter, embodiments of the present invention will be described. The scope of the present invention is not restricted to these explanations, and various modifications other than the following examples can be made without departing the spirit of the present invention.

(1) Polymer Gel

The polymer gel of the present invention is a polymer gel gelled by crosslinked solvophilic polymer units, wherein the polymer gel contains a solvent, and i) has a three-dimensional network structure having two regions: a first region in which the polymer units are densely present and a second region in which the polymer units are sparsely present, and ii) a mesh size composed of the first region is the range of 1 to 500 μm.

In other words, although the polymer gel of the present invention is formed from the solvophilic polymer units, the polymer gel behaves as if poorly soluble polymers are phase-separated in a solvent, and has a structure in which two regions with different polymer concentrations: a dense phase (first region) in which polymer components are densely present and a dilute phase (second region) in which polymer components are sparsely present, are formed in the gel. The polymer gel of the present invention forms a sponge-like three-dimensional network structure/porous structure by this phase separation (hereinafter, such a structure may be referred to as "sponge-like porous structure"). The mesh size is also characterized by being on the order of µm, which is much larger than the order of nm obtained by conventional gels. Here, the first region is referred to as "dense phase" in a relative sense that the concentration (density) of the polymer units present in the region is higher than the density in the second region. Preferably, the first region has a concentration (density) of about 100 times that of the second region.

In the present specification, the "gel" is generally a dispersion system of a polymer that has high viscosity and lost fluidity, and refers to a state having a relationship of $G' \geq G''$ between a storage modulus $G'$ and a loss modulus $G''$.

As described above, the polymer gel of the present invention includes a porous structure on the order of µm. Specifically, the mesh size composed of the first region can be as large as 1 to 500 µm, and is preferably from 10 to 100 µm. The mesh size means a length of a long side in a mesh unit (i.e., a pore) in which the outer circumference is formed by the first region as the dense phase. Alternatively, when the mesh unit is substantially circular, it can be the length of its diameter. There is a second region, which is a dilute phase, and/or a solvent in the mesh unit.

Typically, the first region as the dense phase has a polymer concentration of 10 to 99 wt's, and the second region as the dilute phase has a polymer concentration of 0 to 1 wt %, based on the entire gel containing the solvent. Preferably, the first region has a polymer concentration of 40 to 80 wt % and the second region has a polymer concentration of 0.01 to 0.1 wt %.

Further, the polymer content of the entire polymer gel of the present invention is 5 wt's or less, preferably 4 wt % or less, and more preferably 1.5 to 3.0 wt %.

As the solvent contained in the polymer gel of the present invention, water or an organic solvent can be used. As the organic solvent, alcohols such as ethanol and polar solvents such as DMSO can be used. Preferably, the solvent is water. When water is used as the solvent, the polymer gel containing such a solvent is a hydrogel.

Hereinafter, the polymer units constituting the polymer gel of the present invention and the characteristic physical properties exhibited by the polymer gel of the present invention will be described.

1-a. Polymer Unit

The polymer units used to form the polymer gel of the present invention are polymers that are solvophilic, i.e., soluble in a solvent contained in the gel. For example, when the gel is a hydrogel containing water as a solvent, the polymer units are preferably hydrophilic polymers. The polymer units can be known polymer units used in the technical field in accordance with the application, shape, and the like of the final gel as long as they are capable of forming a gel by a gelation reaction (such as a crosslinking reaction) in a solution. More specifically, polymer units capable of forming a network structure, particularly a three-dimensional network structure, by crosslinking of the polymer units with each other in the final gel are preferable.

The hydrophilic polymers used as the polymer units may be preferably polymers having a polyethylene glycol backbone or a polyvinyl backbone. Typical examples of the polymers having a polyethylene glycol backbone include polymers having a plurality of arms of polyethylene glycol backbones, and polymers having four arms of polyethylene glycol backbones; polymers having four arms of polyethylene glycol backbones are particularly preferable. Such a gel including a tetra-branched polyethylene glycol backbone is known as a Tetra-PEG gel, and a network-structure network is constructed by an AB-type cross-end coupling reaction between two types of four-armed polymers having an electrophilic functional group such as an active ester structure and a nucleophilic functional group such as an amino group at each end (Matsunaga et al., Macromolecules, Vol. 42, No. 4, pp. 1344-1351, 2009). In addition, Tetra-PEG gels can also be prepared on site easily by simple two-liquid mixing of each polymer solution, and the gelation time can also be controlled by adjusting the pH and ionic strength during gel preparation. Then, these gels have excellent biocompatibility since the main component is PEG.

Polymers having other than a polyethylene glycol backbone can also be used as long as they can be gelled by crosslinking with each other. For example, polymers having a polyvinyl backbone such as methyl methacrylate can also be used.

Although not necessarily limited thereto, a crosslinking unit for reacting two types of polymers: a first polymer unit having one or more nucleophilic functional groups in a side chain or at an end and a second polymer unit having one or more electrophilic functional groups in a side chain or at an end, as the polymer units, is suitable for forming a sponge-like porous structure in the final gel. Here, the total of the nucleophilic functional groups and the electrophilic functional groups is preferably 5 or higher. These functional groups are also preferably present at the ends. Further, the gel precursor can have a composition in which the content of the first polymer units is greater than the content of the second polymer units, or a composition in which the content of the second polymer units is greater than the content of the first polymer units. As described below, in a preferred aspect, a polymer gel can be obtained by once forming two or more types of gel precursors of such different compositions, and crosslinking the gel precursors.

Examples of nucleophilic functional groups present in the polymer units include a thiol group (—SH), an amino group, or —CO$_2$PhNO$_2$ (Ph represents an o-, m-, or p-phenylene group), and those skilled in the art can appropriately use known nucleophilic functional groups. Preferably, the nucleophilic functional groups are —SH groups. The nucleophilic functional groups may be identical or different, and the nucleophilic functional groups are preferably identical. Having the functional groups be identical makes the reactivity with the electrophilic functional groups that serve to form the crosslinking bonds uniform and makes it easy to obtain a gel having a uniform three-dimensional structure.

Active ester groups can be used as the electrophilic functional groups present in the polymer units. Examples of such active ester groups include a maleimidyl group, an N-hydroxy-succinimidyl (NHS) group, a sulfosuccinimidyl group, a phthalimidyl group, an imidazolyl group, an acryloyl group, a nitrophenyl group, and the like. Those skilled in the art can appropriately use known active ester groups. Preferably, the electrophilic functional groups are maleimidyl groups. The electrophilic functional groups may be identical or different, and the electrophilic functional groups are preferably identical. Having the functional groups be identical makes the reactivity with the nucleophilic functional groups that serve to form the crosslinking bonds uniform and makes it easy to obtain a gel having a uniform three-dimensional structure.

Nonlimiting specific examples preferred as polymer units having nucleophilic functional groups at the ends include compounds represented by the following Formula (I) having four polyethylene glycol backbone arms and thiol groups at the ends:

[Chem. 1]

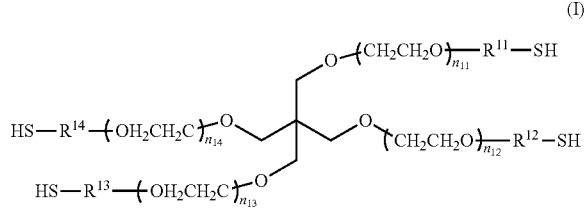

(I)

$n_{11}$ to $n_{14}$ may be identical or different. The closer the values of $n_u$ to $n_{14}$ are, the more uniform the three-dimensional structure can be, and the higher the strength becomes. Thus, in order to obtain a high-strength gel, it is preferable that the values are identical. When the values of $n_{11}$ to $n_{14}$ are too high, the strength of the gel is weakened. When the values of $n_{11}$ to $n_{14}$ are too low, the gel is not likely to be formed due to the steric hindrance of the compound. Therefore, $n_{11}$ to $n_{14}$ are, for example, integer values from 25 to 250, preferably integer values from 35 to 180, more preferably integer values from 50 to 115, and particularly preferably integer values from 50 to 60. The molecular weight is, for example, from $5 \times 10^3$ to $5 \times 10^4$ Da, preferably from $7.5 \times 10^3$ to $3 \times 10^4$ Da, and more preferably from $1 \times 10^4$ to $2 \times 10^4$ Da.

In Formula (I) above, $R^{11}$ to $R^{14}$ are linker sites that connect the functional group and the core portion. $R^{11}$ to $R^{14}$ may be identical or different, and are preferably identical in order to produce a high-strength gel having a uniform three-dimensional structure. $R^{11}$ to $R^{14}$ represent a $C_1$-$C_7$ alkylene group, a $C_2$-$C_7$ alkenylene group, —NH—$R^{15}$—, —CO—$R^{15}$—, —$R^{16}$—O—$R^{17}$—, —$R^{16}$—NH—$R^{17}$—, —$R^{16}$—$CO_2R^{17}$—, —$R^{16}$—$CO_2$—NH—$R^{17}$—, —$R^{16}$—CO—$R^{17}$—, $R^{16}$—NH—CO—$R^{17}$—, or —$R^{16}$—CO—NH—$R^{17}$—. Here, $R^{15}$ represents a $C_1$-$C_7$ alkylene group. $R^{16}$ represents a $C_1$-$C_3$ alkylene group. $R^{17}$ represents a $C_1$-$C_5$ alkylene group.

Here, a "$C_1$-$C_7$ alkylene group" means an optionally branched alkylene group having 1 or more and 7 or less carbon atoms, and means a linear $C_1$-$C_7$ alkylene group or a $C_2$-$C_7$ alkylene group having one or more branches (the number of carbon atoms, including branches, is 2 or more and 7 or less). Examples of $C_1$-$C_7$ alkylene groups include a methylene group, an ethylene group, a propylene group, and a butylene group. Examples of $C_1$-$C_7$ alkylene groups include —$CH_2$—, —$(CH_2)_2$—, —$(CH_2)_3$—, —CH($CH_3$)—, —$(CH_2)_3$—, —CH($CH_3$)_2—, —$(CH_2)_2$—CH($CH_3$)—, —$(CH_2)_3$—CH($CH_3$)—, —$(CH_2)_2$—CH($C_2H_5$)—, —$(CH_2)_6$—, —$(CH_2)_2$—C($C_2H_5$)_2—, and —$(CH_2)_3$C($CH_3$)_2$CH_2$—, and the like.

A "$C_2$-$C_7$ alkenylene group" is a linear or branched, alkenylene group having 2 to 7 carbon atoms having one or more double bonds in the chain. Examples include divalent groups having double bonds formed by eliminating 2 to 5 hydrogen atoms of adjacent carbon atoms from the alkylene group.

Meanwhile, nonlimiting specific examples preferred as polymer units having electrophilic functional groups at the ends include compounds represented by the following Formula (II) having four polyethylene glycol backbone arms and maleimidyl groups at the ends:

[Chem. 2]

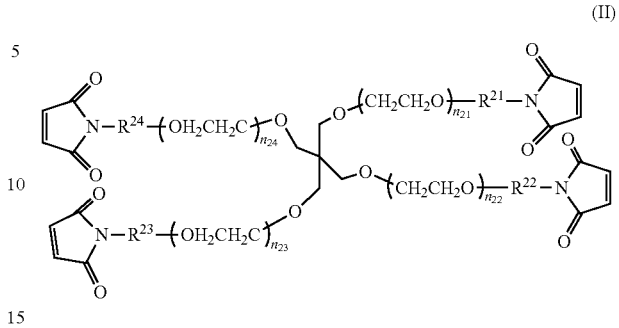

(II)

In Formula (II) above, $n_{21}$ to $n_{24}$ may be identical or different. The closer the values of $n_{21}$ to $n_{24}$ are, the more uniform the three-dimensional structure of the gel can be, and the higher the strength becomes, which is preferable. Thus, the values are preferably identical. When the values of $n_{21}$ to $n_{24}$ are too high, the strength of the gel is weakened. When the values of $n_{21}$ to $n_{24}$ are too low, the gel is not likely to be formed due to the steric hindrance of the compound. Therefore, $n_{21}$ to $n_{24}$ are, for example, integer values from 5 to 300, preferably integer values from 20 to 250, more preferably integer values from 30 to 180, still more preferably integer values from 45 to 115, and yet still more preferably integer values from 45 to 55. The molecular weight of the second tetra-branched compound of the present invention is, for example, from $5 \times 10^3$ to $5 \times 10^4$ Da, preferably from $7.5 \times 10^3$ to $3 \times 10^4$ Da, and more preferably from $1 \times 10^4$ to $2 \times 10^4$ Da.

In Formula (II) above, $R^{21}$ to $R^{24}$ are linker sites that connect the functional group and the core portion. $R^{21}$ to $R^{24}$ may be identical or different, and are preferably identical in order to produce a high-strength gel having a uniform three-dimensional structure. In Formula (II), $R^{21}$ to $R^{24}$ are identical or different and represent a $C_1$-$C_7$ alkylene group, a $C_2$-$C_7$ alkenylene group, —NH—$R^{25}$—, —CO—$R^{25}$—, —$R^{26}$—O—$R^{27}$—, —$R^{26}$—$CO_2$—$R^{27}$—, —$R^{26}$—$CO_2$—NH—$R^{17}$—, —$R^{26}$—CO—$R^{27}$—, —$R^{26}$—NH—CO—$R^{27}$—, or —$R^{26}$—CO—NH—$R^{27}$—. Here, $R^{25}$ represents a $C_1$-$C_7$ alkylene group. $R^{25}$ represents a $C_1$-$C_3$ alkylene group. $R^{27}$ represents a $C_1$-$C_5$ alkylene group.

In the present specification, the alkylene group and the alkenylene group may have one or more optional substituents. Examples of the substituents include, but are not limited to, an alkoxy group, a halogen atom (which may be any of a fluorine atom, a chlorine atom, a bromine atom, or an iodine atom), amino groups, mono- or di-substituted amino groups, substituted silyl groups, acyl groups, aryl groups, and the like. When an alkyl group has two or more substituents, they may be identical or different. The same is also true of alkyl moieties of other substituents (for example, alkyloxy groups and aralkyl groups) including alkyl moieties.

Further, in the present specification, when certain functional groups are defined as "optionally substituted," the types of substituents, positions substituted, and number of substituents are not particularly limited, and when they have two or more substituents, the substituents may be identical or different. Examples of substituents include, but are not limited to, alkyl groups, alkoxy groups, hydroxyl groups, carboxyl groups, halogen atoms, sulfo groups, amino groups, alkoxycarbonyl groups, oxo groups, and the like. Other substituents may also be present in these substituents.

1-b. Physical Properties of Polymer Gel

As described above, the polymer gel of the present invention has a sponge-like porous structure on the order of μm, formed by the dense phase (first region) and the dilute phase (second region) in the gel, and has characteristic properties in terms of various physical properties due to the structure.

The polymer gel of the present invention has a lower permeability than a permeability of the polymer units before gelation. This is because the polymer gel of the present invention has two regions: the dense phase (first region) and the dilute phase (second region), which have different polymer concentrations, in the gel, and the polymer gel behaves as if poorly soluble polymers are phase-separated in a solvent, and thus the polymer gel is not completely transparent and becomes cloudy. Preferably, the polymer gel of the present invention has a permeability of 90 to 96%. In terms of such permeability, the polymer gel exhibits properties completely different from those of normal polymer gels, which are almost transparent.

The polymer gel of the present invention has an osmotic pressure of ⅕ to ½ of an osmotic pressure of the polymer units before gelation. Further, the polymer gel of the present invention has a lower osmotic pressure than a single-phase polymer gel formed from the same polymer units.

In addition, in the polymer gel of the present invention, an osmotic pressure ($\Pi_{os}$) and an elastic pressure ($\Pi_{el}$) after a lapse of a certain period of time from gelation have a relationship of $\Pi_{el} > \Pi_{os}$. The relationship that $\Pi_{el}$ is greater than $\Pi_{os}$ indicates that the gel is in a shrunk state. In contrast, normal polymer gels generally have a relationship of $\Pi_{el} < \Pi_{os}$ and tend to swell.

Although not necessarily restricted by the theory, it is understood that the polymer gel of the present invention has a structure such as a two-phase separation, like a dense phase and a dilute phase, and thus the osmotic pressure ($\Pi_{os}$) of the dilute phase is lower than that of a normal single-phase polymer gel, whereas the polymer gel tends to shrink due to an increase in elastic pressure. In these respects, it can be said that the polymer gel of the present invention has characteristic properties that are significantly different from those of conventional polymer gels.

Further, as described above, since the polymer densities of the polymer units are different between the dense phase and the dilute phase, the polymer gel of the present invention can have different water contents in these two regions. Specifically, in the polymer gel of the present invention, the water content of the first region (dense phase) is in a range of 10 to 99%, and the water content of the second region (dilute phase) is in a range of 99 to 100%.

The polymer gel of the present invention can be processed into a variety of shapes such as a thin film in accordance with the application. Any methods known in this technical field can be used for such processing. For example, in the case of a thin film, the thin film can be obtained by a method applying the gel to a flat substrate such as glass in a state of having fluidity prior to complete solidification.

(2) Process for Producing Polymer Gel

Next, the process for producing a polymer gel (gelation step) of the present invention will be described. The polymer gel of the present invention can be produced by the steps shown in the following first and second aspects. In any of the aspects, the solvophilic raw polymers are crosslinked under conditions less than the overlapping concentration. In the production process of the present invention, it has been newly found that a polymer gel having a porous structure on the order of μm can be obtained from a solvophilic polymer by conducting the gelation step under the above conditions, which has been previously difficult.

2-a. First Aspect of Production Process

The production process of the present invention is characterized by including the following steps in the first aspect:
a) crosslinking solvophilic raw polymers under conditions of less than an overlapping concentration and less than a critical gelation concentration to form gel precursors; and
b) crosslinking the gel precursors with each other using a crosslinking agent to obtain a polymer gel, which is the final target product.

Step a) is a step in which the raw polymers (polymer units) that finally form the polymer gel are reacted in a state on the verge of gelation to have a structure that does not yet form a gel, in other words, to from gel precursors (polymer clusters) in a sol state. Then, in step b), if desired, these gel precursors are further reacted with each other by adding an appropriate crosslinking agent, and the gel precursors are three-dimensionally crosslinked with each other to obtain a polymer gel, which is the final product. Here, the gel precursors are not necessarily limited to a single type of the identical composition, as described below, but multiple gel precursors having different compositions can also be used. As described above, the first aspect of the production process of the present invention is based on the concept that the gel precursors are used an intermediate of the "final gel".

In step a), conditions are used in which the starting concentration of the raw polymers is less than the overlapping concentration and less than the critical gelation concentration. The starting concentration of such raw polymers is used, so that it is possible to from a gel precursor of an ungelled sol state that does not lead to gelation, preferably having a structure on the verge of gelation.

In step a), the starting concentration of the raw polymers is less than the overlapping concentration C*, preferably less than ⅓ of the overlapping concentration C*. Here, the "overlapping concentration" (also referred to as "mutually overlapping concentration") is the concentration at which the polymers in the solvent start to spatially come into contact with each other. Generally, the overlapping concentration C* is expressed by the following Expression:

$$C^* = 3M_w/(4\pi \cdot \alpha \cdot N_A \cdot R_g^3) \quad \text{[Expression 1]}$$

wherein $M_w$ is a weight average molecular weight of the polymer, $\alpha$ is a specific gravity of the solvent, $N_A$ is an Avogadro constant, and $R_g$ is a radius of inertia of the polymer.

For the calculation method of the overlapping concentration C*, reference can be made, for example, to Polymer Physics (written by M. Rubinstein and R. Colby). Specifically, for example, it can be determined by viscosity measurement of a dilute solution using the Flory-Fox equation.

Further, in step a), the starting concentration of the raw polymers is set at less than the critical gelation concentration. Here, the "critical gelation concentration" means the minimum concentration of raw polymers necessary to achieve gelation in a system that constructs a gel of a three-dimensional structure by crosslinking of raw polymers, and also called the minimum gelation concentration. The term critical gelation concentration in the present invention also includes when the concentration of only one type of raw polymer is low, that is, when gelation is not induced due to a non-equivalent ratio of each raw polymer, in addition to when the concentrations of all raw polymers do not reach the gelation concentration, for example, in a system that uses two or more types of raw polymers.

Generally, the critical gelation concentration (minimum gelation concentration) depends on the types of raw polymers used, but such concentrations are known in this technical field or can be ascertained easily by experimentation by those skilled in the art. Typically, the critical gelation concentration is from 0.5 to 5 wt %, and the lower limit is about ⅕ of the overlapping concentration.

For example, as described above, when two types of polymer units having nucleophilic functional groups or electrophilic functional groups are used, for example, a low-concentration condition that includes equivalent amounts of these units but overall is not sufficient to achieve gelation can be used, or a condition in which the concentration of one type of polymer unit is low, that is, no gel is produced due to non-equivalent amounts, can be used as the method of adjusting the starting concentration of raw polymers to a condition less than the critical gelation concentration.

Step a) typically can be carried out by mixing or applying stimulation to a solution containing two types of raw polymers. The step can also be carried out by radical polymerization of monomers using a radical initiator. The concentration of each solution, addition rate, mixing rate, and mixing ratio are not particularly limited and can be adjusted as appropriate by those skilled in the art. Even when three or more types of raw polymers are used, it will be obvious that solutions containing the corresponding raw polymers can be prepared and mixed as appropriate in a similar manner. Water, alcohols such as ethanol, DMSO, and the like can be used as the solvent of the solution containing the raw polymers. When the solution is an aqueous solution, an appropriate pH buffer solution such as a phosphate buffer solution can be used.

A two-solution mixing syringe such as that disclosed, for example, in WO2007/083522 can be used as a mixing unit. The temperature of the two solutions during mixing is not particularly limited and should be a temperature that dissolves each of the precursor units and creates a state in which each of the solutions is fluid. An example of the solution temperature during mixing is a range of 1° C. to 100° C. The temperature of the two solutions may differ, but it is preferable for the ease of mixing the two solutions that the temperature be the same.

The gel precursors obtained in step a) are formed under conditions that do not yet attain gelation even though the gel precursors have a structure in which precursor units are bonded or crosslinked with each other. The gel precursors have a relationship of $G'<G''$ between the storage modulus $G'$ and the loss modulus $G''$. The value of the loss modulus $G''$ is known to generally be higher than the storage modulus $G'$ in a polymer before gelation, and magnitude of these physical property values reverses, with $G'$ becoming higher, as gelation occurs thereafter. The point where $G'=G''$ is the so-called gelation point. Therefore, the fact that $G'<G''$ in the gel precursor clusters means that the gel precursor clusters are in a sol state, and a state that has not yet gelled. Preferably, $G'<G''<100 G'$ at a frequency of 1 Hz.

Preferably, $G''$ of the gel precursors is in a range of 0.005 to 5 Pa, more preferably 0.01 to 1 Pa, and still more preferably 0.01 to 0.5 Pa at a frequency of 1 Hz. These moduli of elasticity can be calculated by a known method such as dynamic viscoelasticity measurement using a known measurement device such as a rheometer.

The gel precursor in the present invention preferably has a diameter of 10 to 1000 nm, more preferably 50 to 200 nm. Preferably, it is desired that the abundance ratio of the gel precursor having a diameter of about 100 nm is the largest in the distribution.

The raw polymers used to form the gel precursor clusters are polymers that are solvophilic, i.e., soluble in a solvent contained in the gel. A detailed description thereof is as described for the polymer units in the polymer gel of the present invention described above.

Next, in step b), the gel precursors obtained in step a) are further reacted with each other and three-dimensionally crosslinked with each other to obtain a polymer gel as the final product. As described above, since the gel precursors are formed so as to be in a state before the gelation point, the substituents used for crosslinking remain in an unreacted state in each of the gel precursors. Therefore, the final gel is formed by crosslinking by reacting these substituents in the gel precursors with residual substituents in other gel precursors.

The polymer gel finally obtained in step b) includes a structure having two regions: a first region in which the polymer units derived from the raw polymers are densely present and a second region in which the polymer units derived from the raw polymers are sparsely present. Accordingly, the fact that a polymer gel having a porous structure on the order of μm can be obtained from solvophilic raw polymers is as described in the description of the polymer gel according to the present invention.

Preferably, in step b), a crosslinking agent for crosslinking the gel precursors with each other can be added or stimulation can be applied. One having substituents the same as the crosslinking groups in the raw polymers can be used as such a crosslinking agent. The raw polymers themselves can also be used as a crosslinking agent, and can be additionally added. For example, when gel precursors are obtained by reacting non-equivalent amounts of two types of raw polymers having nucleophilic functional groups or electrophilic functional groups in step a), the gel precursors can be crosslinked with each other by adding a crosslinking agent having functional groups of the lower concentration. Bis (sulfosuccinimidyl)glutarate ($BS_2G$), DL-dithiothreitol (DTT), a synthetic peptide having a thiol group at an end, or the like can be used as such a crosslinking agent. Further, functional groups (maleimide groups, etc.) can be irradiated with ultraviolet light, for example, to cause photodimerization as a stimulation for crosslinking.

In a preferred aspect, step b) can also be conducted in the presence of a non-reactive polymer having no functional group capable of crosslinking with the gel precursor in the molecule. Such a non-reactive polymer is suitable for obtaining a three-dimensional structure such as a two-phase separation, like a dense phase and a dilute phase. Examples of non-reactive polymers include polymers that have identical basic backbones as the raw polymers, but do not have any crosslinking reactive group in a side chain or at an end, such as polyethylene glycol having no crosslinking reactive group. Alternatively, a material such as cellulose or modified cellulose can be used.

Other reaction solution conditions and the like in step b) are similar to those in step a). Preferably, in step b), the final gel can be obtained in a reaction time of 2 hours or less, preferably 1 hour or less. In general, when producing a gel containing a low concentration of a polymer, a long reaction time is required (depending on the system, for example, about 8 hours when the polymer content is 1 wt % or less). Meanwhile, in the present invention, the gel can be produced in a much shorter time.

2-b. Second Aspect of Production Process

In the second aspect, the production process of the present invention includes the following step:
c) crosslinking solvophilic raw polymers having a concentration of less than an overlapping concentration and equal to or more than a critical gelation concentration with each other in the presence of a non-reactive polymer having a predetermined concentration to obtain the polymer gel.

Specifically, in the second aspect of the production process of the present invention, a non-reactive polymer having a predetermined concentration is added to a solution, so that the polymer gel of the present invention can be obtained in one step, without passing through a gel precursor stage from raw polymer in the first aspect. Even in this case, a raw polymer having a concentration less than the overlapping concentration is used, so that it is possible to obtain a polymer gel having two regions: a dense phase and a dilute phase and having a porous structure on the order of μm.

Here, the non-reactive polymer is a polymer that does not have any functional group capable of crosslinking with the raw polymer in the molecule. Examples of non-reactive polymers include polymers that have identical basic backbones as the raw polymers, but do not have any crosslinking reactive group in a side chain or at an end, such as polyethylene glycol having no crosslinking reactive group. Alternatively, a material such as cellulose or modified cellulose can be used. Preferably, the concentration of the non-reactive polymer is from 1/10 to 10, and more preferably from 1/5 to 2 of the concentration of the raw polymers.

Further, the starting concentration of the raw polymers in the second aspect is the same as that in the first aspect in that the starting concentration is less than the overlapping concentration. Meanwhile, the second aspect is different from the first aspect in that the starting concentration of the raw polymer is equal to or more than the critical gelation concentration and gelation is conducted in one step.

In addition, the reaction solution conditions, the mixing method, and the like are similar to those in the first aspect.

EXAMPLES

Hereinafter, the present invention will be described in more detail with reference to Examples, but the present invention is not limited thereto. In the following experiments, the $^1$H NMR spectrum was analyzed using JNM-ECS400 (400 MHz), manufactured by JEOL Ltd. Deuterated chloroform was used as a solvent, and tetramethylsilane was used as an internal standard. The molecular weight was determined using the linear positive ion mode of an Ultraflex III mass spectrometer made by Brucker Daltonics, Inc. In the following examples, the unit of polymer concentration (g/L) is used, which corresponds to 1 g/L=about 0.1 wt %.

Example 1

Synthesis of Gel Precursors [SHPEG+MAPEG]

A gel precursor serving as a precursor in a gelation reaction was synthesized in the following manner using tetrathiol-polyethylene glycol (SHPEG) having a —SH group at the end and tetramaleimidyl-polyethylene glycol (MAPEG) having a maleimidyl group at the end. As these raw polymers SHPEG and MAPEG, those commercially available from NOF CORPORATION. were used (both had a molecular weight of 10,000).

Two 50 mM citric acid-phosphate buffer solutions, containing SHPEG and MAPEG, respectively, were separately prepared (amount ratio of the materials: SHPEG/MAPEG=1/1, overall polymer concentration: 20 g/L). The two solutions thus obtained were mixed in another container, and defoamed and stirred with a planetary centrifugal mixer. Then, the mixed solution was quickly transferred to a Falcon tube. The tube was capped to prevent drying and allowed to stand at room temperature for 12 hours. At this time, plurality of samples containing two types of gel precursors was prepared so that an excess of either of SHPEG and MAPEG was a molar ratio of SHPEG:MAPEG of 0.78:0.22 or 0.22:0.78.

A rheometer was used to observe the temporal changes in storage modulus G' and loss modulus G" in the step (at 25° C. and 1 Hz). It was confirmed that the samples had a relationship of G'<G" at the end point of the reaction, and these were polymer clusters in a sol state that had not yet formed a gel.

Example 2

Synthesis of Polymer Gel

A polymer gel (Oligo-TetraPEG gel) was synthesized in the following manner using the gel precursor synthesized in Example 1.

The gel precursor solution A (r=0.78) and the gel precursor solution B (r=0.22) obtained in Example 1 were respectively diluted with water to 10 g/L (or 20 g/L). The amount of unreacted SH groups in each of the solutions was calculated, a crosslinking agent (bis-(sulfosuccinimidyl)glutarate ($BS_2G$)) was added in an equal amount to the above amount, and the resultant mixture was defoamed and stirred with a planetary centrifugal mixer. Then, the mixed solution was quickly transferred to a Falcon tube. The tube was capped to prevent drying and allowed to stand at room temperature for 5 hours. Observation was conducted with a rheometer (at 25° C. and 1 Hz), and it was confirmed that the solution had a relationship of G'>G" at the end point of the reaction, and a polymer gel was formed by crosslinking of the gel precursors (FIG. 1).

Example 3

Permeability of Polymer Gel

Figure 2:
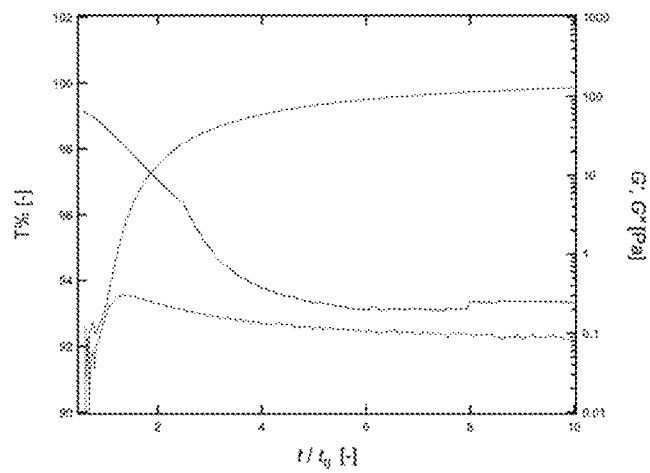
FIG. 2 is a graph showing changes in permeability in a gelation step of the present invention.

FIG. 2 shows changes in permeability in the gelation step of Example 2. The two solutions of the gel precursors were mixed and injected into cuvettes, and the permeability was calculated from the temporal changes of the absorbance at 25° C. and a wavelength of 400 nm. In the figure, changes in G' and G" are also shown, and the point at which G'=G" is the gelation point.

Figure 3:
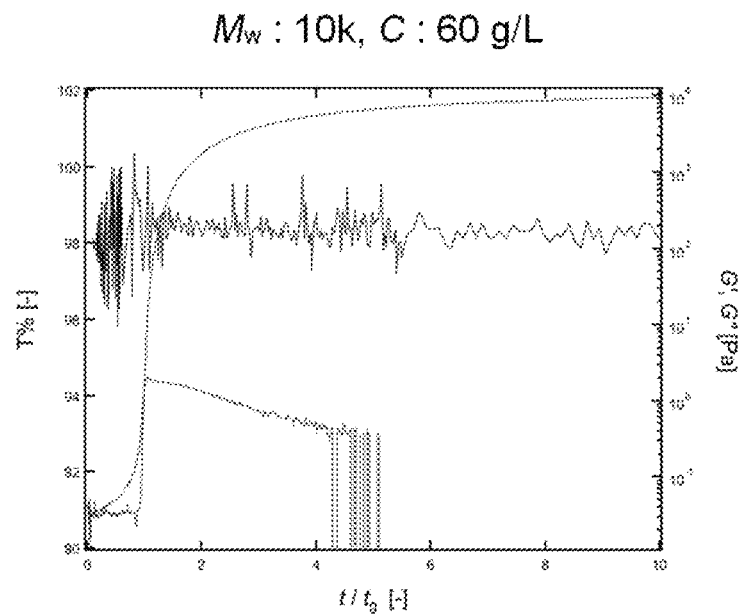
FIG. 3 is a graph showing changes in permeability of a comparative example gel which does not pass through a gel precursor stage.

Further, FIG. 3 shows the changes in permeability and G' and G" for a single-phase polymer gel (Comparative Example) obtained by mixing two solutions: 60 g/L of SHPEG and MAPEG solutions without passing through a gel precursor step.

The comparison between FIGS. 2 and 3 showed that, in the normal gel without passing through a gel precursor step (FIG. 3), almost no change in permeability was observed before and after gelation (T=around 98%), whereas, in the polymer gel of Example 2 (FIG. 2), the permeability T decreased significantly from about 99% to about 94% with gelation, and the gel became cloudy. This is because, in the polymer gel of the present invention, two regions: a dense phase with the polymer units densely present and a dilute phase with the polymer units sparsely present were generated due to gelation, and phase separation occurred.

Example 4

Swelling Test of Polymer Gel

A swelling test was conducted on three types of polymer gels (a and b) of the present invention and a comparative example gel (c). Gels a and b were synthesized according to Example 2.

a) Oligo-Tetra-PEG Gel (10 g/L)

Two types of gel precursors were produced at 20 g/L, r=0.78; 20/L, r=0.22 according to Example 2. Each of the gel precursor solutions was diluted to 10 g/L and the two solutions were mixed to form a gel.

b) Oligo-Tetra-PEG Gel (20 g/L)

Two types of gel precursors were produced at 20 g/L, r=0.78, 20 g/L, r=0.22 according to Example 2. Each of the gel precursor solutions is directly mixed to form a gel.

c) Tetra-PEG gel (Comparative Example)

60 g/L SHPEG and MAPEG solutions were mixed to form a gel.

Figure 4:
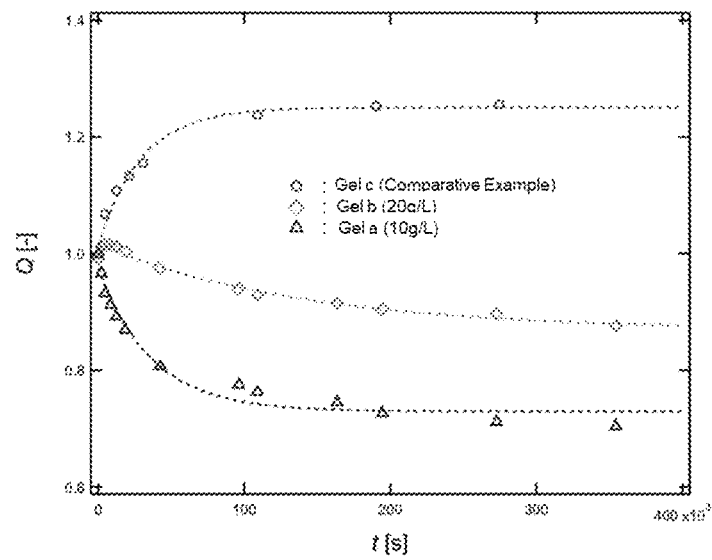
FIG. 4 is a graph showing temporal changes in the degree of swelling of the polymer gel of the present invention.

A cylindrical sample (height 7 mm, diameter 15 mm) was produced. After the gelation reaction was sufficiently completed (1 day), the sample was immersed in pure water and the temporal changes of degree of swelling were measured at 25° C. The results obtained are shown in FIG. 4.

In the normal gel c without passing through a gel precursor step, swelling of the gel was observed over time. Meanwhile, the polymer gel of the present invention showed characteristic properties of shrinking with long relaxation times.

Example 5

Osmotic Pressure Test of Polymer Gel

The osmotic pressure ($\Pi_{os}$) and elastic pressure ($\Pi_{el}$) of the polymer gel of the present invention produced according to Example 2 were measured. As Comparative Examples, the raw polymer before gelation and the normal gel without passing through a gel precursor step were measured in a similar manner to the above measurement.

Polymer Gel of the Present Invention:

According to Example 2, gels produced under a plurality of conditions with gel precursor solution concentrations of 10, 12.5, 15, 17.5, and 20 g/L were used.

Raw Polymer:

10, 20, 30, 40, 50, and 60 g/L of MAPEG solutions were used.

Comparative Example Gel:

10, 20, 30, 40, 50, or 60 g/L of SHPEG and MAPEG solutions were mixed and gelled.

A sample was produced in a dialysis membrane and dialyzed against a PVP solution (29 k, 5 to 120 g/L), and the concentration of PVP that did not swell from the initial state was determined. At that point, the swelling pressure of the gel ($\Pi_{os}-\Pi_{el}$) and the osmotic pressure of PVP ($\Pi_{PVP}$) are balanced. Separately, the elastic pressure ($\Pi_{el}=G'$) was measured with a rheometer, and $\Pi_{os}$ was calculated using the following Expression:

$$\Pi_{os}=\Pi_{PVP}+\Pi_{el} \quad \text{[Expression 2]}$$

Figure 5:
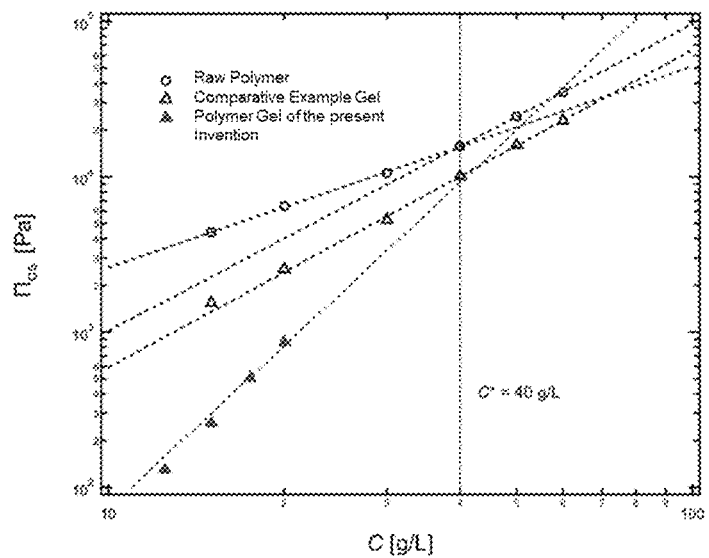
FIG. 5 is a graph showing changes in osmotic pressure ($\Pi_{os}$) of the polymer gel of the present invention.

FIG. 5 shows a plot of the osmotic pressure ($\Pi_{os}$) obtained at each gelation concentration (C). As a result, it was found that the polymer gel of the present invention had an osmotic pressure lower than both the raw polymer and the comparative example gel having identical concentrations in the overlapping concentration (C*) or less.

Example 6

Fluorescence Microscope Images of Polymer Gel

The structures of the gel of the present invention and the comparative example gel were observed using a two-photon laser microscope (Zeiss).

a) Oligo-Tetra-PEG Gel (10 g/L)

Two types of gel precursors were produced at 20 g/L, r=0.78; 20 g/L, r=0.22 according to Example 2. Each of the gel precursor solutions was diluted to 10 g/L and the two solutions were mixed to form a gel.

b) Tetra-PEG Gel (Comparative Example)

60 g/L of SHPEG and MAPEG solutions were mixed to form a gel.

After preparing the gel samples a and b, the gel samples were allowed to stand in water for 7 days.

Primary staining: the gel samples were immersed in an anti-PEG solution (0.04 g/L), allowed to stand for 1 hour, and washed for 15 minutes three times.

Secondary staining: the gel samples were immersed in antibody-AlexaFloar488 (0.04 g/L), allowed to stand for 1 hour, and washed for 15 minutes three times.

Figure 6:
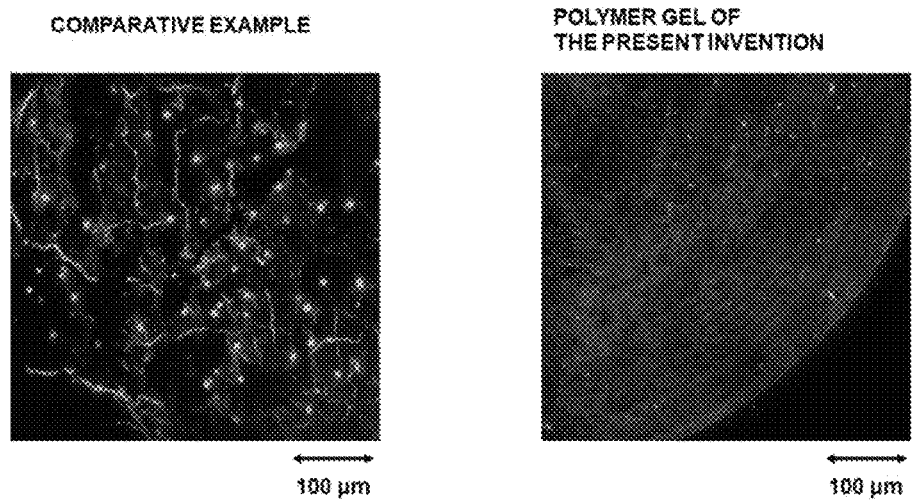
FIG. 6 shows fluorescence microscope images of the polymer gel of the present invention (right) and the comparative example gel (left).

FIG. 6 shows the obtained fluorescence microscope images. It was found that the Tetra-PEG gel (right figure) of the comparative example had a network structure on the order of nm, whereas the polymer gel of the present invention (left figure) had a structure on the order of μm much larger than the structure predicted from the molecular structure (porous structure). The network structure on the order of μm has an outer circumference formed by a dense phase with polymers densely present, and the inside thereof is a dilute phase or a solvent.

Example 7

Adhesion of Cells to Polymer Gel

The adhesion of cells to the polymer gel of the present invention produced in Example 2 was also evaluated. As a result, it was confirmed that the polymer gel of the present invention was able to adhere ATDCS (somatic pluripotent cells) more efficiently than the normal Tetra-PEG gel (Comparative Example) without passing through a gel precursor step.

The above results demonstrate that the gel obtained by crosslinking the polymer raw materials under the conditions of less than the overlapping concentration and less than the critical gelation concentration behaves like a phase separation in poorly soluble polymers, and the gel having a μm-scale porous structure, which has been previously impossible to achieve, can be produced in a solvent by a one-pot procedure.

The invention claimed is:

1. A polymer gel in which solvophilic polymer units are cross-linked with each other,
wherein the polymer gel contains a solvent and has a three-dimensional network structure having two regions: a first region in which the solvophilic polymer units are densely present and a second region in which the solvophilic polymer units are sparsely present, and a mesh size composed of the first region is in the range of 1 to 500 μm.

2. The polymer gel according to claim 1, wherein the polymer gel has a lower permeability than a permeability of the solvophilic polymer units before gelation.

3. The polymer gel according to claim 1 or 2, wherein the polymer gel has an osmotic pressure of ⅕ to ½ of an osmotic pressure of the solvophilic polymer units before gelation.

4. The polymer gel according to claim 1, wherein an osmotic pressure ($\Pi_{os}$) and an elastic pressure ($\Pi_{el}$) after a lapse of a certain period of time from gelation have a relationship of $\Pi_{el} > \Pi_{os}$.

5. The polymer gel according to claim 1, wherein a polymer concentration in the first region is from 10 to 99 wt %, and a polymer concentration in the second region is from 0 to 1 wt %.

6. The polymer gel according to claim 1, wherein the polymer gel has a polymer content of 5 wt % or less.

7. The polymer gel according to claim 1, wherein the solvent is water and the solvophilic polymer units are hydrophilic polymer units.

8. The polymer gel according to claim 7, wherein the hydrophilic polymer units are polymers having a polyethylene glycol backbone or a polyvinyl backbone.

9. The polymer gel according to claim 1, wherein the solvophilic polymer units comprise a first polymer unit having one or more nucleophilic functional groups in a side chain or at an end and a second polymer unit having one or more electrophilic functional groups in a side chain or at an end.

10. The polymer gel according to claim 9, wherein the one or more nucleophilic functional groups are selected from the group consisting of a thiol group, an amino group, and —$CO_2PhNO_2$, and the one or more electrophilic functional groups are selected from the group consisting of a maleimidyl group, an N-hydroxy-succinimidyl (NHS) group, a sulfosuccinimidyl group, a phthalimidyl group, an imidazolyl group, an acryloyl group, and a nitrophenyl group.

11. A process for producing a polymer gel comprising:
a) crosslinking solvophilic raw polymers under conditions of less than an overlapping concentration and less than a critical gelation concentration to form gel precursors, wherein the gel precursors have a relationship of G'<G" between a storage modulus G' and a loss modulus G";
b) crosslinking the gel precursors with each other using a crosslinking agent to obtain the polymer gel; and
c) allowing the polymer gel to stand in water for at least 7 days;
wherein the polymer gel has a three-dimensional structure including two regions: a first region in which polymer units derived from the solvophilic raw polymers are densely present and a second region in which polymer units derived from the solvophilic raw polymers are sparsely present and a mesh size composed of the first region is in the range of 1 to 500 μm.

12. A process for producing a polymer gel comprising
a) crosslinking solvophilic raw polymers having a concentration of less than an overlapping concentration and equal to or more than a critical gelation concentration with each other in the presence of a non-reactive polymer having a predetermined concentration to obtain the polymer gel, and
b) allowing the polymer gel to stand in water for at least 7 days;
wherein the non-reactive polymer is a polymer having no functional group capable of crosslinking with the raw polymers in a molecule, and
the polymer gel has a three-dimensional structure including two regions: a first region in which polymer units derived from the solvophilic raw polymers are densely present and a second region in which polymer units derived from the solvophilic raw polymers are sparsely present and a mesh size composed of the first region is in the range of 1 to 500 μm.

13. The process for producing a polymer gel according to claim 11 or 12, wherein the solvophilic raw polymers are hydrophilic polymers.

14. The process for producing a polymer gel according to claim 13, wherein the hydrophilic polymers are polymers having a polyethylene glycol backbone or a polyvinyl backbone.

15. The process for producing a polymer gel according to claim 11 or 12, wherein the solvophilic raw polymers comprise a first polymer having one or more nucleophilic functional groups in a side chain or at an end and a second polymer having one or more electrophilic functional groups in a side chain or at an end.

16. The process for producing a polymer gel according to claim 15, wherein the one or more nucleophilic functional groups are selected from the group consisting of a thiol group, an amino group, and —$CO_2PhNO_2$, and the one or more electrophilic functional groups are selected from the group consisting of a maleimidyl group, an N-hydroxy-succinimidyl (NHS) group, a sulfosuccinimidyl group, a phthalimidyl group, an imidazolyl group, an acryloyl group, and a nitrophenyl group.

17. The process for producing a polymer gel according to claim 11, wherein the gel precursors have a diameter of 10 to 1000 nm.

18. The process for producing a polymer gel according to claim 11, wherein the gel precursors comprise a first gel precursor and a second gel precursor,
the first gel precursor and the second gel precursor both have a first polymer having one or more nucleophilic functional groups in a side chain or at an end and a second polymer having one or more electrophilic functional groups in a side chain or at an end,
the first gel precursor has a higher first polymer content than a second polymer content, and the second gel precursor has a higher second polymer content than a first polymer content.

19. The process for producing a polymer gel according to claim 11, wherein step b) is conducted in the presence of a non-reactive polymer having no functional group capable of crosslinking with the gel precursor in the molecule.

20. The process for producing a polymer gel according to claim 12 or 19, wherein the non-reactive polymer is polyethylene glycol or cellulose, which has no crosslinking reactive group.

* * * * *